United States Patent [19]

Renner

[11] 4,446,963
[45] May 8, 1984

[54] RETURN CHAIN ROLLER SUPPORT FOR EN MASSE CONVEYOR

[75] Inventor: Elmer J. Renner, Aurora, Ill.

[73] Assignee: Allis-Chalmers Corporation, Milwaukee, Wis.

[21] Appl. No.: 321,317

[22] Filed: Nov. 13, 1981

[51] Int. Cl.³ .................................................. B65G 19/18
[52] U.S. Cl. ...................................... 198/735; 198/842
[58] Field of Search ............... 198/733, 735, 842, 861, 198/729; 193/35 R, 37

[56] References Cited

U.S. PATENT DOCUMENTS

| | | | |
|---|---|---|---|
| 1,816,327 | 7/1931 | Hise | 198/842 |
| 2,693,269 | 11/1954 | Bentley | 198/842 |
| 4,183,430 | 1/1980 | Hunter | 198/735 |
| 4,222,482 | 9/1980 | Kelley | 198/735 |

FOREIGN PATENT DOCUMENTS 1446555 8/1976 United Kingdom ................. 198/861

*Primary Examiner*—Joseph E. Valenza
*Assistant Examiner*—Jonathan D. Holmes
*Attorney, Agent, or Firm*—Charles L. Schwab

[57] ABSTRACT

A large capacity en masse conveyor for bulk materials includes a centrally positioned link type conveyor chain (26) with transverse flights (71) connected to the underside of the chain links (61) at regular intervals. The flights (71) include a main V-shaped angle member (72) with wear shoes (91, 92), which may be replaceable shoes (172), at its outer ends engageable with longitudinal wear strips (93, 94) adjacent the side walls (41, 42) of the conveyor casing (11). An idler roller (29) is upwardly removable from its support (111) upon removal of the cover (49) and fastening bolts (126) and nuts (127). The roller support (111) is upwardly removable from the casing (11) upon removal of the cover (49) and bolts (132) and nuts (131) by which the support (111) is releasably secured to the casing side walls (41, 42). The roller (29) is positioned sufficiently close to the cover (49) so the flights (71) will engage the cover (49) to prevent the chain from jumping the flanges (136, 137) of the roller (29) should the chain (26) be subjected to undulations of predetermined magnitude.

5 Claims, 6 Drawing Figures

RETURN CHAIN ROLLER SUPPORT FOR EN MASSE CONVEYOR

RELATED APPLICATIONS

My copending U.S. Pat. application Ser. No. 321,323 filed Nov. 13, 1981 for Large Capacity En Masse Conveyor shows structure similar to that illustrated in this application.

BRACKGROUND OF THE INVENTION

1. Technical Field

This invention relates to an en masse conveyor having a single endless chain to which flights are secured at predetermined intervals.

2. Prior Art

The use of return chain rollers in a conveyor having a single endless chain with flights secured at intervals thereto is shown in U.S. Pat. No. 1,255,750.

BRIEF DESCRIPTION OF THE INVENTION

This invention has particular utility in a large capacity en masse conveyor using a central heavy duty chain with flights secured thereto at appropriate intervals. In such a large capacity conveyor, the weight of the chain and flights makes it necessary to provide intermediate support for the return run of the conveyor. In the present invention, the support for the return run is provided by a series of return rollers in supporting relation to the chain. Since the flights extend laterally a considerable distance from the chain and the roller for supporting the chain is preferably of no greater axial length than necessary to properly support the chain, the prior practice of supporting the roller shaft on the conveyor casing side walls would result in an unduly long roller shaft with attendant mounting and deflection problems. The present invention provides a removable roller support which fits within the conveyor casing where it attaches to the laterally inner sides of the casing side walls. The present invention also provides mounting beams for the roller shaft spaced laterally inwardly substantial distances from the side walls which permit releasable attachment of the shaft on top thereof and upward removal of the roller and its shaft for replacement or repair. The roller includes radially outward extending flanges for maintaining the chain side bars on adjacent cylindrical load bearing surfaces. By positioning the roller at a predetermined distance from the top of the conveyor casing, the flights on the return run will be sufficiently close to the casing top to engage it and prevent the chain from "jumping" a roller flange should the chain be subjected to unusual undulations.

It is a main object of this invention to provide a support for the return roller of a large capacity en masse conveyor which is easily installed within the conveyor casing and is removable upon release of releasable fastening means securing it to the casing side walls.

It is a further object of this invention to provide a return roller support which reinforces the side walls of the conveyor casing.

It is a further object of this invention to provide a support for a flanged return roller for heavy duty chain of a conveyor wherein the clearance between the return run of the conveyor and the underside of the casing cover is less than the height of the roller flanges thus insuring that the chain will stay aligned with the cylindrical load bearing surfaces of the roller.

It is a further object of this invention to provide a return roller support which permits the roller shaft to be releasably secured to the top thereof and to be upwardly removable therefrom upon release of releasable fastening means.

BRIEF DESCRIPTION OF THE DRAWINGS

The invention is illustrated in the drawings in which:

FIG. 5 is an end view of a flight of alternate construction with portions broken away for illustration purposes; and FIG. 6 is a view taken along the line VI—VI in FIG. 5.

DETAILED DESCRIPTION OF THE DRAWINGS

Figure 4:
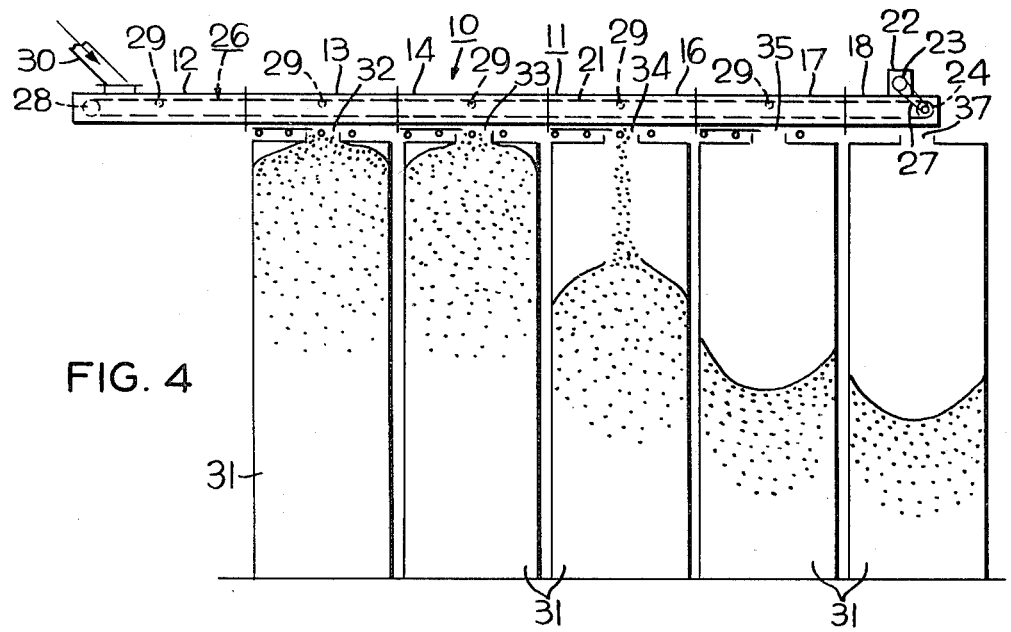
FIG. 4 is a schematic showing of the conveyor delivering bulk material to a series of storage silos.

Referring to FIGS. 1-4, the en masse conveyor unit 10 is capable of moving bulk material at a high delivery rate. For instance, this conveyor unit is expected to have the capability of delivering coal to large power plants at rates up to 1500 tons per hour. The conveyor unit includes a dust-tight casing or housing 11 which, as shown in FIG. 4, may be made up of a plurality of sections 12, 13, 14, 16, 17, 18 bolted together at their abutting ends by bolts and nuts extending through aligned openings in flanges on the ends of the side, top and bottom walls. End walls are bolted to the extreme ends of end sections 12 and 18. The endless chain conveyor 21 is driven by an appropriate power unit 22 which may include an electric motor and speed reducer whose output sprocket 23 is connected to the drive sprocket 24 for the conveyor chain 26 by an endless drive chain 27. The opposite end of the endless chain is carried by an idler pulley 28 and the upper return run is supported by idler rollers 29 spaced at intervals therealong. Bulk material, such as coal, is fed to the conveyor 10 through a feed chute 30 and the bulk material is discharged into storage containers or silos 31 through gate controlled discharge openings 32, 33, 34, 36 and an ungated discharge opening 37.

Figure 1:
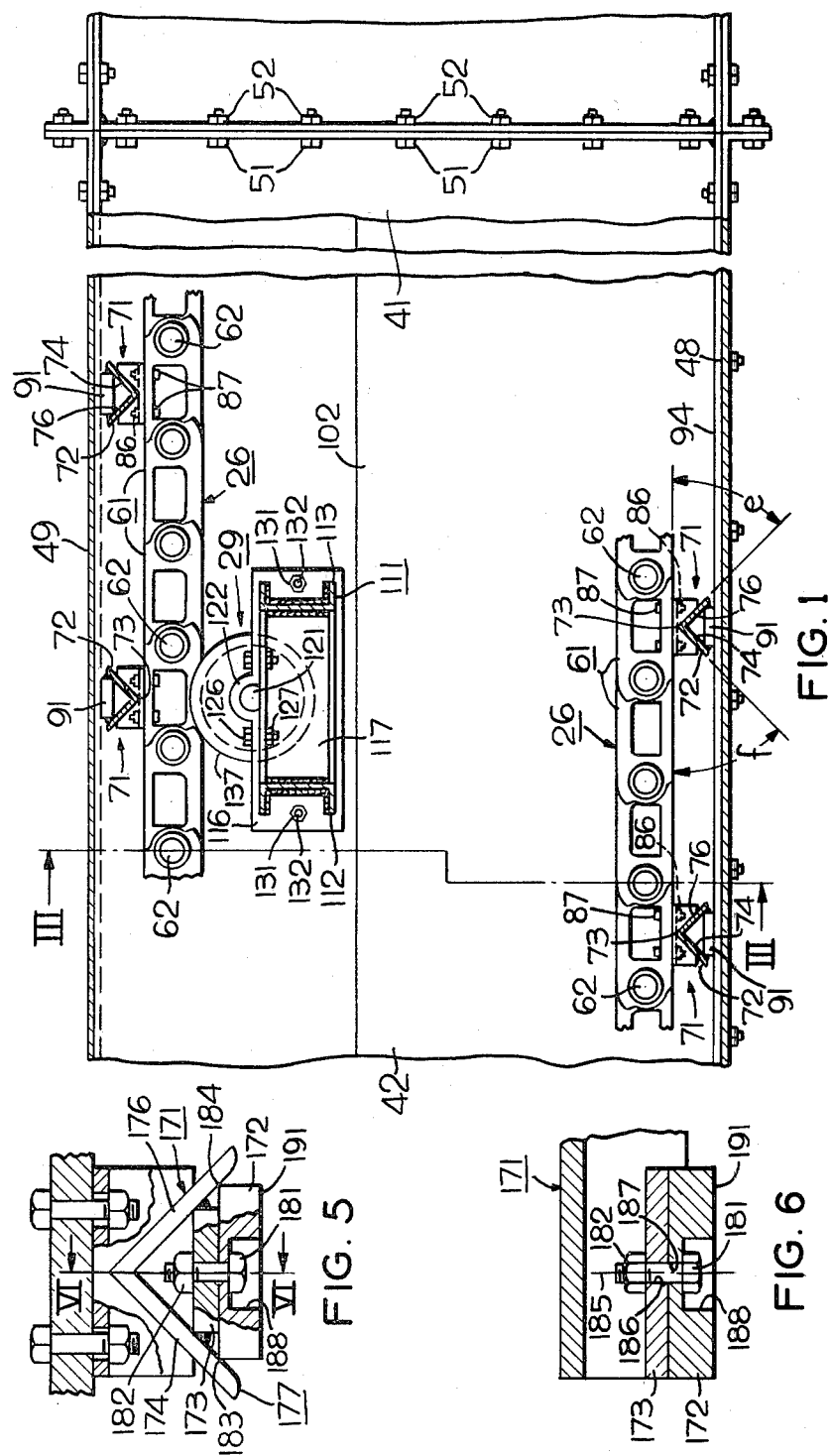
FIG. 1 is a partial side view of an en masse conveyor with parts removed for illustration purposes.
Figure 2:
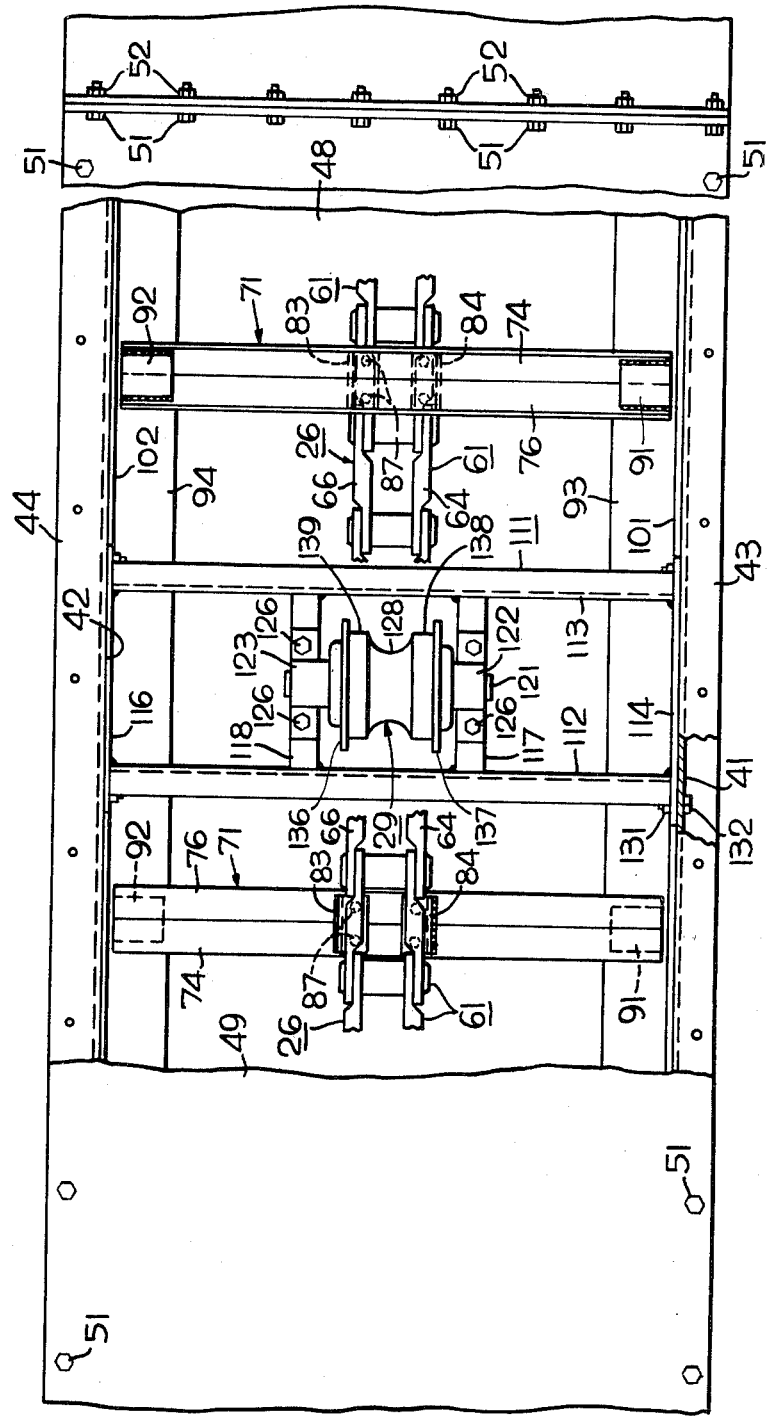
FIG. 2 is a partial top view of the conveyor shown in FIG. 1 with a portion of the top wall or cover removed for illustration purposes.
Figure 3:
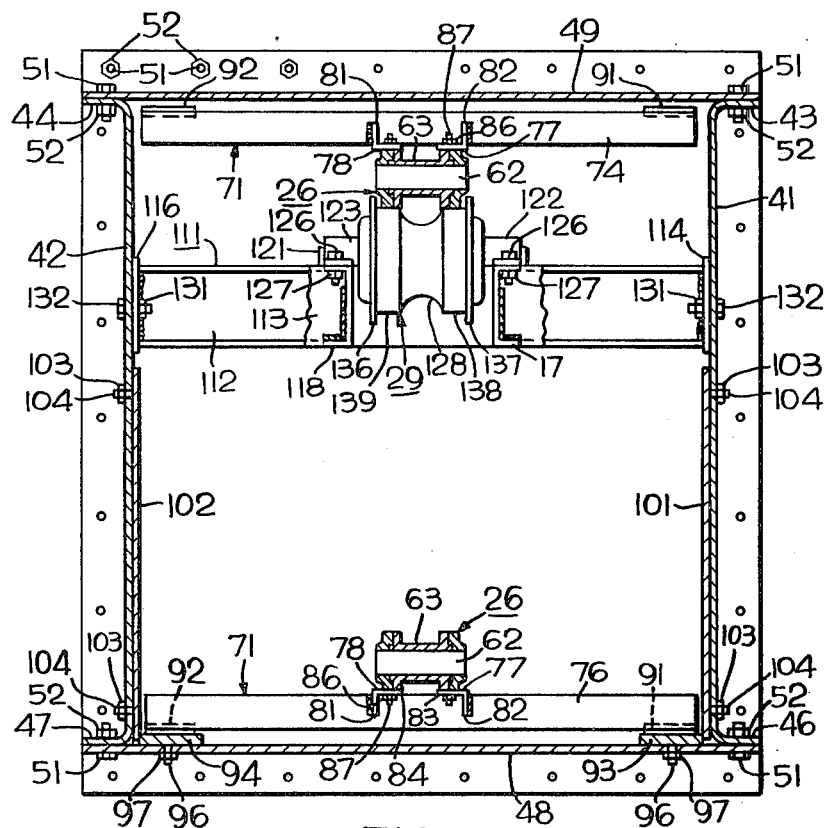
FIG. 3 is a section taken along the line III—III in FIG. 1.

The conveyor casing section 12, portions of which are shown in detail in FIGS. 1-3, includes a pair of parallel, transversely spaced vertical side walls 41, 42 having top and bottom flanges 43, 44, 46, 47 releasably secured to a horizontal floor or bottom wall 48 and a horizontal cover or top wall 49 by bolts 51 and nuts 52. The casing sections 12, 13, 14, 16, 17, 18 are releasably connected in end-to-end relation by nuts 52 and bolts 51 extending through aligned openings in abutting end flanges on longitudinally opposite ends of their side, bottom and top walls.

The conveyor includes an endless chain 26 having links 61 pivotally connected end-to-end by pins 62 and bushings 63. Each link includes a pair of generally parallel, laterally spaced side bars 64, 66 having aligned transverse bores at their corresponding opposite ends into which the pins 62 and bushings 63 are press fit. The coaxial pins and bushings are so proportioned that the pins 62 will rotate within the bore of their mating bushings 63. As illustrated, every third link has a flight 71 releasably secured thereto. Each flight 71 includes a main transverse member or angle 72 positioned so that its apex 73 is adjacent the chain 26 and its flanges 74, 76 diverge downwardly away from the apex 73 and the chain 26 at 45 degree angles e,f to the plane defined by the lower edges of chain side bars to which the flight is connected. A pair of mounting brackets 77, 78 have longitudinally vertical extending flanges 81, 82 which are cut out to fit the V-section angle flanges 74, 76 and are rigidly secured thereto as by welding. Horizontal flanges 83, 84 of the brackets 77, 78 extend laterally inwardly toward one another and lie adjacent to the side bars 64, 66 of a chain link 61. The brackets 77, 78, and hence the flight 71, are rigidly but releasably secured to the side bars 64, 66 by nuts 86 and bolts 87 extending through registering vertical openings in the flanges 83, 84 and side bars 64, 66. Shoes or wear blocks 91, 92 of wear resistant steel are welded to the inside of the flanges 74, 76 of the angle 72 at its opposite transverse ends. The bottom wear surface of the wear blocks 91, 92 slidingly engage a pair of longitudinally extending wear strips 93, 94 releasably secured to the casing bottom or floor 48 by threaded studs 96 welded to the strips 93, 94 and nuts 97 threaded on the studs.

The flights 71 are symmetrical about their central transverse vertical plane and also about their central vertical longitudinal plane, thus permitting each flight to be reversed end for end. This symmetry also permits the conveyor chain to be operated in either direction. By positioning the angle member 72 of the flight 71 below the chain 26, its structural integrity is preserved, the chain is held off the floor a sufficient distance to prevent the chain from dragging on the floor, and bulk material between the side bars will pass by gravity downwardly over the sloping flanges 74, 76 when the flight passes over a discharge opening. Removable side liners 101, 102 are releasably held in place on the laterally inner sides of side walls 41, 42 by nuts 103 threadedly engaging threaded studs 104 welded to the liners 101, 102. The wear strips 93, 94, shoes 91, 92 and liners 101, 102 are made of an abrasion-resistant alloy steel having a low rate of wear. The bottom wall 48 is also made of an abrasion-resistant steel.

The upper return run of the conveyor chain 26 is carried by a series of longitudinally spaced support rollers 29 supported by a novel mounting support 111 which also serves as a reinforcing member for the casing section side walls 41, 42. The roller support 111 includes a pair of longitudinally spaced, transversely extending parallel support beams in the form of channel members 112, 113, vertical end or mounting plates 114, 116 to which corresponding opposite ends of the channel members 112, 113 are welded and a pair of transversely spaced longitudinally extending parallel mounting beams in the form of channel members 117, 118 welded at their corresponding opposite ends to intermediate portions of the transverse channel members 112, 113. The support channels 117, 118 are positioned laterally inwardly a substantial distance from the side walls 41, 42 and removably support opposite lateral ends of a stationary shaft 121 projecting from opposite ends of the shell 128 of a support roller 29. The shaft 121 is releasably secured to the channel members 112, 113 by mounting brackets 122, 123 resting on top thereof, the brackets 122, 123 being secured to the channel member 112, 113 by bolts 126 and nuts 127. The roller support 111 is releasably secured to the casing side walls 41, 42 by nuts 131 and bolts 132 extending through aligned openings in the side walls and end plates 114, 116. Each of the channel members 112, 113, 117, 118 includes upper and lower horizontal flanges integrally interconnected by a vertical web.

The roller shell 128 of the roller 29 is rotatably mounted on the shaft 121 by suitable bearings, not shown. The roller shell 128 includes a pair of radially outward extending flanges 136, 137 adjacent the cylindrical surfaces 138, 139. The return run of the chain 26 is supported by the cylindrical surfaces 138, 139 of the roller shell 128 and the flanges 136, 137 keep the chain from shifting laterally during operation of the conveyor. As seen on reference to FIGS. 1 and 3, the rollers 29 are positioned sufficiently close to the top wall or cover 49 so that the chain 26 cannot jump up and laterally over the roller flanges 136, 137. In other words, the height of the flanges above the rolling surfaces 138, 139 is greater than the distance between the shoes 91, 92 and the cover 49.

The roller 29 may be removed upwardly from its support 111 upon removal of the cover 49 and the releasable fastening means in the form of bolts 126 and nuts 127 securing the roller mounting brackets 122, 123 to the mounting beams 117, 118. The fabricated roller support 111 may be removed upwardly from the casing section 12 upon removal of the cover 49 and the releasable fastening means in the form of bolts 132 and nuts 131 securing the support 111 to the side walls 41, 42. This construction affords efficient assembly, disassembly and replacement of the roller and its support. Additionally the support 111 reinforces the side walls 41, 42.

Referring to FIGS. 5 and 6, an alternate flight 171 has a detachable wear shoe 172 releaseably secured by a bolt 181 and nut 182 to a horizontal shoe mounting part 173 welded to the inside of flanges 174, 176 of angle member 177. The lower surface of the mounting part 173 is disposed above the lower ends of the flanges 174, 176 and the edges 183, 184 of the shoe are adjacent the flanges 174, 176. This arrangement prevents the shoe 172 from turning about the axis 185 of the bolt 181 and the bolt receiving openings 186, 187 in the part 173 and the shoe 172. A counterbore 188 in shoe 172 is of sufficient diameter to permit the head of the bolt 184 to be recessed therein a substantial distance from the wear surface 191 of the shoe 172.

OPERATION

Referring to FIG. 4, when the power unit 22 drives the conveyor chain 26, the lower working run moves to the right and the upper return run moves to the left. Coal, or other bulk material, delivered to the conveyor 10 by chute 30, falls through the spaces between the flights 71 of the upper run and is deposited on the floor of the casing 11 where it is moved en masse by the conveyor flights 71. It should be understood that the horizontal bed of coal being moved will be considerably deeper than the vertical height of the flights 71. The roller support 111 is designed to not only permit easy installation of the support and then the roller but also permits easy servicing of the roller. If it is necessary to remove the roller 29 for servicing or replacement its shaft mounting brackets 122, 123 can be readily released from the support 111 by removal of the nuts 127 and then the roller 29 can be upwardly removed from the support 111. The roller support structure 111 serves to reinforce the side walls 41, 42 of the casing which is particularly beneficial in conveyor installations where the side walls 41, 42 act as support beams, such as where a casing section is supported near its opposite ends without intermediate support. If the chain 26 is subjected to unusual vertical and lateral undulations during an operation, the flights 71 will engage the underside of the cover or top wall 49 to prevent the chain 26 from jumping over the roller flanges 136, 137.

The embodiments of the invention in which an exclusive property or privilege is claimed are defined as follows:

1. In an en masse conveyor apparatus having a longitudinally extending casing made up of sections of predetermined length and generally rectangular cross section releasably secured to one another in an end to end relationship, an endless conveyor chain with a lower working run and an upper return run disposed in the central vertical longitudinal plane of the casing and having pivotally interconnected links with laterally spaced side bars and transversely extending flights secured at their central portions to selected links of the chain, the combination comprising:

a roller for supporting the return run of said conveyor chain having a shell with laterally spaced radially outward facing cylindrical surfaces engageable, respectively, with said laterally spaced side bars of said chain and having a stationary shaft with mounting portions extending transversely beyond axially opposite ends of said roller shell, one section of said casing presenting transversely spaced vertical side walls, a support for said roller including a pair of longitudinally spaced horizontal support beams extending transversely between said side walls, a pair of transversely spaced horizontal mounting beams extending longitudinally between and secured to said support beams, said mounting beams being disposed inwardly a substantial distance from said side walls, and detachable fastening means securing said ends of said shaft to the upper sides, respectively, of said mounting beams whereby the axis of said shaft is horizontal and transverse to said longitudinal central vertical plane and releasable securing means fastening the laterally opposite ends of said support beams to said side walls, respectively, said support for said roller serving to reinforce said side walls and being removable therefrom upon release of said releasable securing means, said one section being removable from said casing without requiring prior removal of said support.

2. The combination of claim 1 wherein said roller is removable upwardly from said roller support upon detachment of said detachable fastening means.

3. The combination of claim 1 wherein said one section includes a removable cover and wherein said roller support mounted thereon is removable upwardly from said casing upon release of said releasable securing means.

4. The combination of claims 1, 2 or 3 wherein said roller support includes vertical end plates rigidly secured to the laterally opposite ends of said support beams, the end plates being parallel and adjacent to the laterally inward side of said side walls, and wherein said releasable securing means includes bolts extending through aligned openings in said end plates and side walls.

5. The combination of claims 1, 2 or 3 wherein said beams are structural steel members each having vertically spaced upper and lower horizontal flanges and a vertical web extending between and integrally fixed to said upper and lower flanges.

* * * * *